(12) United States Patent
Butine

(10) Patent No.: US 8,204,723 B2
(45) Date of Patent: *Jun. 19, 2012

(54) ENTERPRISE MULTI-PROGRAM PROCESS DEVELOPMENT AND INTEGRATION PROCESS

(75) Inventor: Thomas J. Butine, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/038,440

(22) Filed: Mar. 2, 2011

(65) Prior Publication Data

US 2011/0153685 A1    Jun. 23, 2011

Related U.S. Application Data

(63) Continuation of application No. 11/422,391, filed on Jun. 6, 2006, now Pat. No. 7,917,344.

(51) Int. Cl.
    *G06G 7/48*  (2006.01)
(52) U.S. Cl. ......................................... 703/6
(58) Field of Classification Search ........................ 703/6
    See application file for complete search history.

(56) References Cited

U.S. PATENT DOCUMENTS

| | | | |
|---|---|---|---|
| 5,781,454 A | 7/1998 | Alexander |
| 5,930,512 A | 7/1999 | Boden et al. |
| 6,141,776 A | 10/2000 | Grose et al. |
| 6,268,853 B1 | 7/2001 | Hoskins et al. |
| 6,339,838 B1 | 1/2002 | Weinman, Jr. |
| 6,442,512 B1 | 8/2002 | Sengupta et al. |
| 6,442,515 B1 | 8/2002 | Varma et al. |
| 6,556,950 B1 | 4/2003 | Schwenke et al. |
| 6,826,521 B1 | 11/2004 | Hess et al. |
| 6,862,553 B2 | 3/2005 | Schwenke et al. |
| 6,973,638 B1 | 12/2005 | Gangopadhyay et al. |
| 7,917,344 B2 * | 3/2011 | Butine .............................. 703/6 |
| 2002/0052862 A1 | 5/2002 | Scott et al. |
| 2002/0120921 A1 | 8/2002 | Coburn et al. |
| 2003/0233273 A1 | 12/2003 | Jin et al. |
| 2004/0128120 A1 | 7/2004 | Coburn et al. |
| 2004/0143811 A1 | 7/2004 | Kaelicke et al. |
| 2004/0204947 A1 | 10/2004 | Li et al. |
| 2004/0254945 A1 | 12/2004 | Schmidt et al. |
| 2005/0273352 A1 | 12/2005 | Moffat et al. |
| 2006/0074915 A1 | 4/2006 | Bhandarkar et al. |

OTHER PUBLICATIONS

The Workflow Management Coalition Specification, Process Definition Interchange; Workflow Process Definition Interface—XML Process Definition Language; pp. 1-87; Oct. 25, 2002.*
Jarke, M.; Scenarios for Modeling; Communication of the ACM; Jan. 1999; 2 pages.
Weidenhaupt, K. et al.; Scenarios in System Development: Current Practice; Mar. 1998; pp. 34-45.

* cited by examiner

*Primary Examiner* — Hugh Jones
(74) *Attorney, Agent, or Firm* — Armstrong Teasdale LLP

(57) ABSTRACT

Tools and methods allow an enterprise to define a set of processes and create scenarios which link and integrate combinations of processes. In addition, both processes and scenarios can be categorized, enabling re-use of existing definitions and easing subsequent scenario building. Processes and scenarios both allow variations which are stipulated to have a certain applicability in terms of organizations within the enterprise and time-frame. The variations can be evolved and improved over time via versions. Subsequently designed process scenarios can be tested and released for use in an organization and used to drive work planning, initiation and status reporting.

19 Claims, 5 Drawing Sheets

ENTERPRISE MULTI-PROGRAM PROCESS DEVELOPMENT AND INTEGRATION PROCESS

CROSS-REFERENCE TO RELATED APPLICATIONS

This application is a continuation application of U.S. patent application Ser. No. 11/422,391, filed Jun. 6, 2006 now U.S. Pat. No. 7,917,344.

BACKGROUND OF THE INVENTION

This invention relates generally to processes utilized within an enterprise, and more specifically to process development and integration of processes for use across multiple programs of an enterprise that provide products and/or services to customers.

Larger enterprises (e.g., governments, large corporations) frequently use hundreds, and possibly thousands, of different processes in order to perform a single service or manufacture a single product. Many of these processes, and the computing systems that support them, could be shared across many different services and/or products. However, without the ability to find and use common and similar processes across multiple product/service lines, to control variations in those processes, and to integrate those processes, each program must invent their own set of processes, and the computing systems that support the processes. These processes and systems must be maintained for the lifetime of the product/service which can be 50 years or more. This is extremely expensive. For example, a large corporation could have 100 major programs developing complex products, with each program having a lifetime of 50 years. The development and improvement of these products could consist of thousands of processes linked together into scenarios. Many of these processes rely on complex customized computing systems to support them. Typically, 75% or more of the processes and computing systems could be common (or common with minor variations) across the programs. If this commonality were not harnessed and managed, each of the programs would have to develop the processes and their supporting computing systems independently, and maintain them over their 50 year life spans. In the course of process maintenance, multiple versions of a particular process may come into existence.

Typically corporations define processes using a document-based or text-based approach, even if the documents are digitally-based flowcharts and descriptions. In this approach, the intelligence of the process is in the eye of the beholder. Specifically, users of these processes have to read and interpret the process steps, their inputs and outputs, and the roles and computing involved, in order retrieve or analyze any information about the process and interpretations by multiple users can vary. Simply put, a text-based process approach has no structure and must be interpreted by a human. A model-based definition has a defined structure and can be interpreted by software, which can then edit, analyze and integrate the process. In many of these text-based approaches, software-based analyses and integration cannot be enabled because the structure of the definitions is not well-defined or controlled. In order to integrate the processes used by a program (by connecting their inputs and outputs) and to manage their re-use and variation by other programs, the processes must be captured in computer-based business models. By modeling processes, they can be integrated (their inputs and outputs can be connected and their names and definitions made common and shared), the inputs/outputs can be defined precisely, common resource definitions for performing the process can be assigned, and the process can be analyzed to reduce inefficiencies within the process steps. The process execution can be simulated and resource usage can be tracked and even forecasted using such a model. In large-scale complex processes, it is not practical to integrate, analyze and manage the processes that are document-based. A model-based, computer-sensical representation is needed.

Processes typically are not managed enterprise-wide. Rather, the processes are managed in connection with delivering a certain service or in producing a particular end product, and not necessarily across services and across product lines. Such processes are not managed across service and product lines because, at least in part, it is extremely difficult to characterize, define and capture all information related to such processes.

SUMMARY OF THE INVENTION

Systems and methods are provided for modeling, integration and management complex business processes and their variations applied to large-scale enterprises with multiple product and service programs. Granular, stand-alone process definitions, comprised of constituent process steps, are stored in a library. Process definitions have variations, where the differences are controlled and managed, and each variation is versioned to allow for incremental improvement over time. Scenario definitions (also having variations and versions) are created by instancing (or using references to) the process definitions, as well as instances of other (smaller scope) scenarios. Scenarios are the definitions that are used by organizations. Inputs and outputs are used to join/link the internal process steps of a process definition. Process definitions are instanced into scenarios as the process steps of the scenario. Process definitions have unconnected external inputs/outputs. They can be connected only via the connections of their instantiation as process steps in scenarios. Moreover, each process step is associated with the roles of individuals, teams or organizations that perform the step and with the tools used to support its performance. The inputs and outputs are modeled/defined in a Business or Conceptual Object Model, in which the object is described and its attributes and relationships to other objects are defined. Process and scenario definitions, objects, roles and tools are categorized in a hierarchical index structures. These indices form the architecture for an organization's business model and enable the control of variation and the elimination of gaps and overlaps in the model. Ownership is assigned to the nodes in the indices to enable the control of variation and improvements via new versions.

BRIEF DESCRIPTION OF THE DRAWINGS

The foregoing brief summary of the invention, as well as the following detailed description, is better understood when read in conjunction with the accompanying drawings, which are included by way of example, and not by way of limitation with regard to the claimed invention. In the accompanying drawings, the same or similar elements are labeled with the same reference numbers.

DETAILED DESCRIPTION OF THE INVENTION

Methods are provided which utilize a business model repository to provide central access to and use of elements of the business model. These elements are process, scenario, object, role, tool and applicability definitions. The business model architecture is composed of indices of each of the elements which serve to categorize, scope, bound the definitions and to identify gaps, overlaps and variations. Process definitions are instanced into scenarios and their inputs/outputs connected to form a large-scale executable business model for the corporation's organizations (e.g., programs, business units, functional disciplines). Processes and scenarios can be made applicable for different organizations, and can be varied and improved/evolved (versioned). By controlling the variation of processes and scenarios and by knowing which are used in the various organizations, the cost of developing and maintaining processes and their supporting computing systems, and for training people to execute them, can be greatly reduced. Process and scenario definitions can be utilized to automate employee training and be used with workflow tools to track performance of processes. Instancing of processes into scenarios allows multiple organizations within a large corporation to share common processes (and the expensive computing systems that enable them), and to control the degree of variation allowed. Utilizing computer-sensible models for processes and scenarios enables integration, analysis, simulations, optimization and deployment to organization in the form of automated work order initiation and statusing, and process-based work plans.

Figure 1:
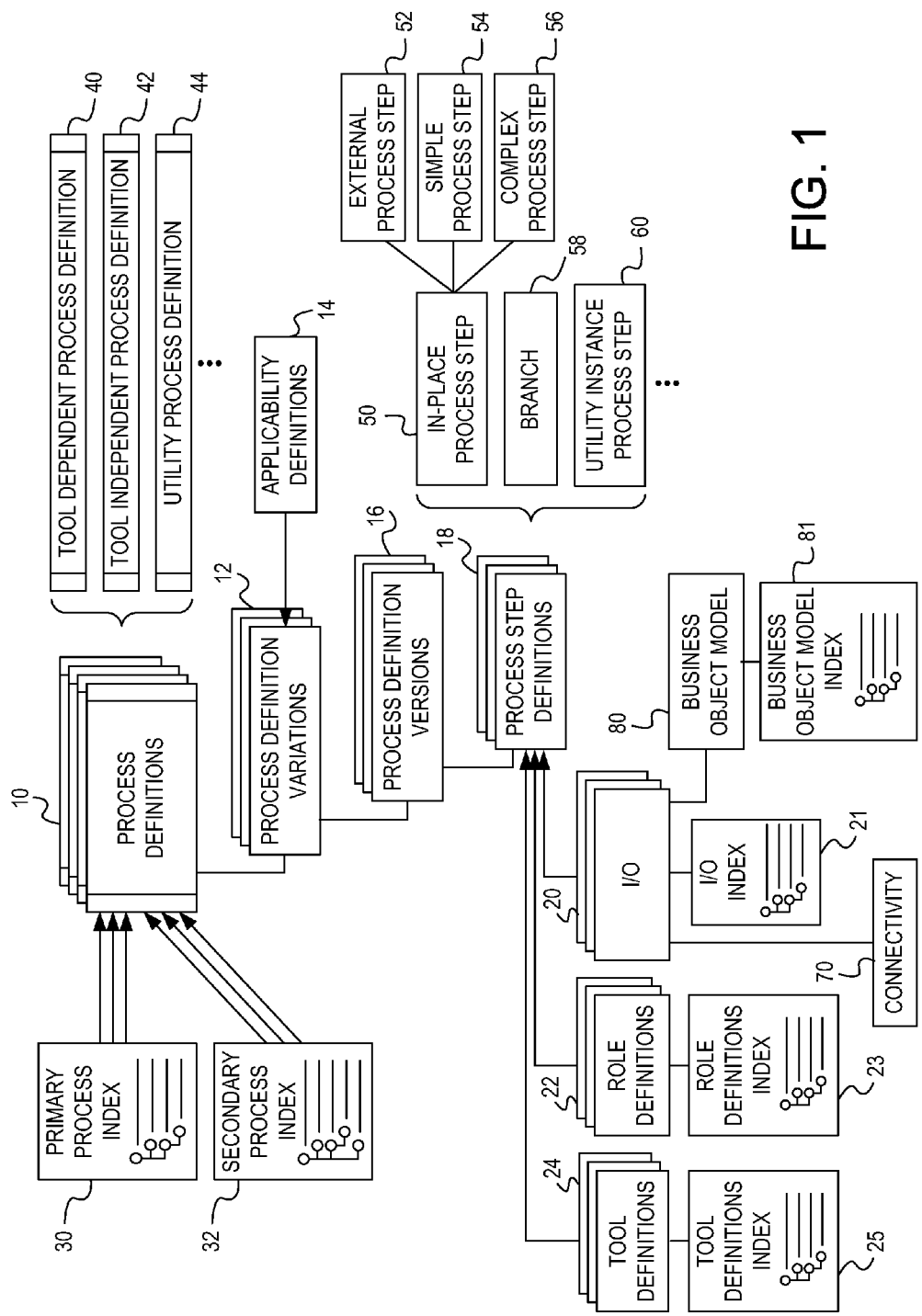
FIG. 1 depicts process definitions and related information.

FIG. 1 depicts a process definition 10 element of the business model and its related information according to one or more embodiments of the invention. The diagram depicts this related information as objects, which may be implemented in a computer system as objects in an object-oriented programming language (e.g., Java or C++). Likewise, this information may be stored in relational database tables, object databases, and so forth.

Process definitions 10 may include a facility for allowing variations 12 of the process. For example, if a particular team within an organization uses a process with the same inputs and outputs, but does it in a manner different from a process definition stored in a library (shown in FIG. 3), then rather than create a new process definition, the team can create a variation of the existing process definition 10. Each process definition has at least one variation 12 (the original or base definition) and may have multiple variations. Each variation has an applicability 14, which identifies for which organization units/programs and for what points in time the definition is applicable. In addition, each variation of a process definition has at least one version 16 (the original or base) and can have multiple versions 16 are used to identify the improvement or evolution of the variation.

For a given process definition, variation, and version, the process step definitions 18 which together make up a process definition are defined and linked. Each variation and version of a process definition may have a different set of process steps, although at a minimum, different versions and variations of a process definition should all consume the same or similar inputs to produce the same or similar outputs. A process step definition includes references to the definitions of its inputs and outputs 20, references to the definitions of roles 22 used to perform or supervise the needed actions and references to the definitions of tools 24 (and specific tool user interfaces for tool-dependent process steps) that support the execution of the process. The inputs/outputs reference definitions of classes and their inter-relationships in a business object model 80. The objects within the model 80 are categorized in an index 81 that forms the business object architecture. Roles 22 include descriptions of skills or training required by a person to participate in the process definition step. Roles 22 are separately indexed 23 in order to facilitate the associated organization and hierarchy. Tools 24 include descriptions of tools (e.g., computing systems, machines, etc.) required to perform steps, and as with roles, they are separately indexed 25. Other information may be stored with a process definition step, such as, a textual description of the process, estimates of time taken, special handling information, and so forth. Business object, role and tool definitions are also versioned to identify and manage their evolution/improvement.

Process definitions 10 are categorized by multiple indices 30, 32, each providing a different hierarchical way of slicing and accessing a collection of process definitions. These indices comprise the process architecture. Primary index 30 is organized by taxonomy/similarity of function across the organization. It serves as the primary mechanism for controlling commonality and variation, and for detecting gaps in the process structure. Nodes in the index structure can have designated "owners' who can control the process definitions and the variations. All the process definitions associated with the manufacture of products, for example, may be in one category, and subcategories beneath that may further divide process definitions based on product family and product. Secondary index 32 may index processes by the types of inputs, outputs, tools, or rules they use or produce, or by owner. There may be any number of secondary indices. All process definitions are required to be referenced by the Primary index 30. Secondary indices 32 may reference the Primary index 30 at any node in the index (and then to all definitions in the category) or they can point to specific definitions, or both, and they can have their own unique categories at levels higher than their references to the primary index.

Process definitions 10 are of two types, each of which may follow its own conventions. The tool-dependent process definition 40 may provide very specific information about how to perform a process using a specific set of tools (e.g., machinery, equipment, computer software). Such a process definition can be more instructive for employees, but may not be useful to other groups within an organization who may rely on different tools. These definitions are related to specific user interfaces to the tool. Tool-independent process definition 42 provides a general description of a process without delving into implementation details. Such a definition may be more useful throughout an organization. Each of these definitions may include "utility" processes 44, which are common low level definitions that can be used in many process definitions. These utility processes are instanced into other process definitions as "utility instance" process steps 60.

Process definition steps 18 may include multiple types of process steps, each of which may follow its own conventions. An in-place process step 50 is the most common type of step, where the action to be performed on the inputs is described within the process step. An external process step 52 uses an external reference to an entity external to the library (shown in FIG. 3) in order to provide information about the process step. In-place process steps can be simple or complex. A simple process step 54 involves a single action be performed, whereas a complex process step 56 involves multiple actions, which are defined by decomposing the step into multiple lower level process steps. These lower level steps may themselves be complex, but eventually simple steps, which don't decompose, are defined. A branch 58 is an evaluation or decision be made in order to proceed through the process definition to downstream steps. A simple process step 54 in a tool-independent definition may decompose into several simple or complex steps in the tool-dependent definition 40. A utility instance process step 60 is a reference to a utility process definition. In one embodiment, it is a virtual process step that is connected to other process steps via its inputs/outputs, just like all of types of process steps, but the definition of the step is obtained through the reference to the source definition for the utility process definition. The utility instance process step definition may contain certain instance-specific information: the instance name, instance description, and instance-specific sub-class names for roles, tools and I/O. The connectivity 70 of the process step definitions 18 is specified by aligning/connecting the inputs and outputs 20 of the process step definitions 18, or, for the case of the utility instance process step 60, the instance-specific sub-classes of the referenced utility process definition's inputs/outputs.

Figure 2:
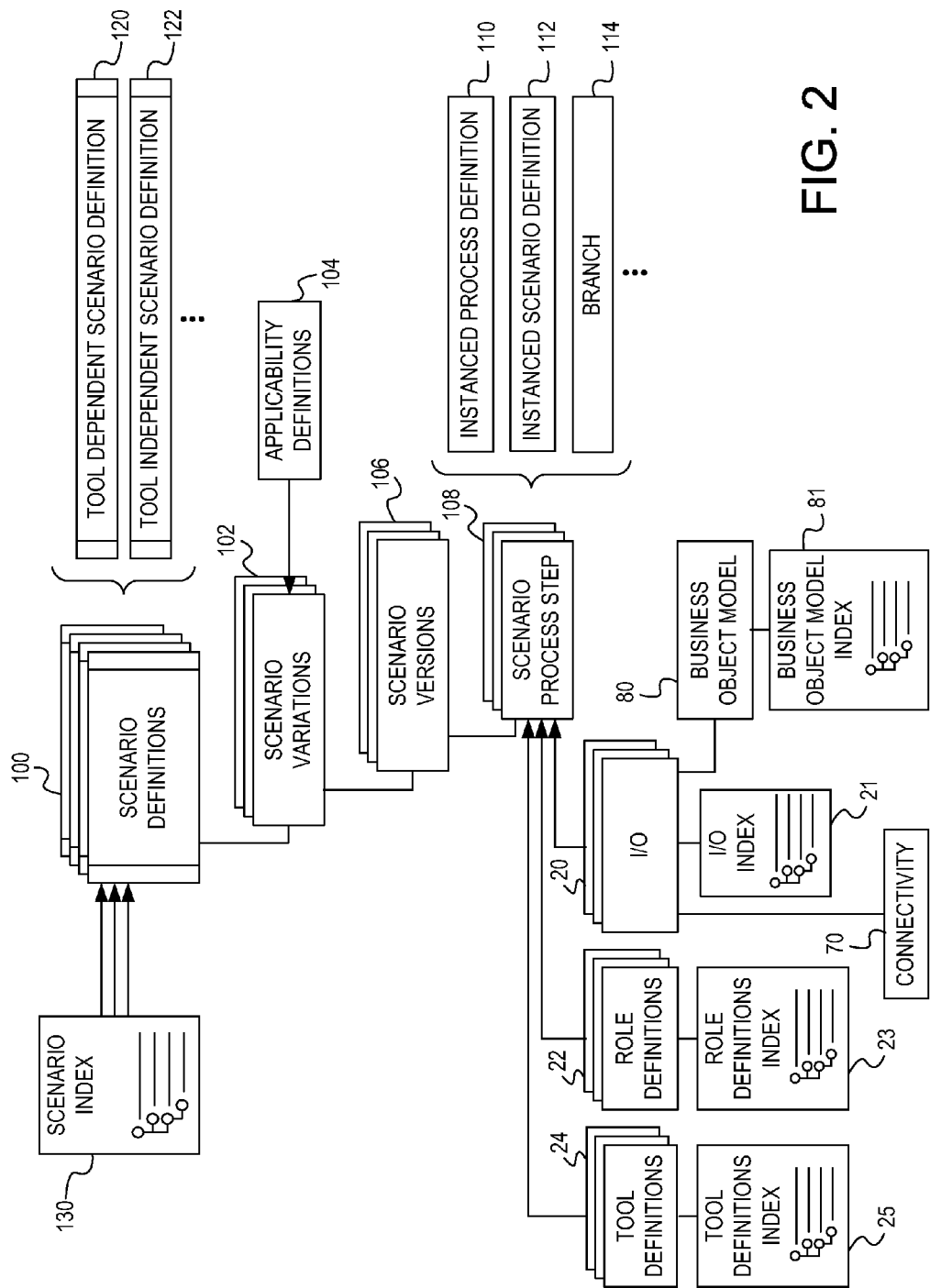
FIG. 2 depicts scenario definitions and related information.

FIG. 2 depicts scenario definitions 100 and related information according to one or more embodiments of the invention. As with process definitions 10, scenario definitions 100 can have variations 102 having an associated applicability 104 and versions 106. In one embodiment, scenario definitions 100 are indexed and cataloged to form the scenario architecture. Scenario definitions are the same as process definitions except they have "instanced" process steps 108 (process steps that reference and use other definitions) and cannot have "in-place" process steps. There are two types of these instanced steps. The first type is instanced process definitions 110, which are virtual copies of process definitions that retain a relationship to their parent process definitions 10. The second type is instanced scenario definitions 112, which is a virtual copy of another scenario definition (of a smaller scope). Both of these types of instanced scenario step definitions, as with the utility instance process step definitions of a process definition, contain the reference to the source definition and the instance-specific information: the instance name, instance description, instance-specific sub-class names for roles, tools and I/O. Finally, a branch 114 can be placed as a scenario step definition, allowing a decision or evaluation to be made in order to select among paths to other scenario step definitions. As with process definitions, a scenario definition can be tool dependent 120 or tool independent 122. However, unlike process definitions, the—dependent definitions are generated views. Process definitions are the only definitions for which tool-dependent views may be authored, since those are the most detailed definitions and since scenario definitions, at their most detail, merely instance process definitions. So, the tool-dependent view of a scenario definition merely retrieves/assembles the most detailed definitions of its instances, in accordance with the scenario's tool-independent definition. Scenarios are also hierarchically categorized in a scenario index 130, again similar to process definitions. Scenario step definitions inherit their role definitions 22, inputs and outputs 20, and tool definitions 24 from the definitions being instanced within, except where sub-classes of those definitions have been specified as part of the instance-specific information. The connectivity of the scenario step definitions 108 is specified by aligning/connecting the inputs and outputs 20 of the instanced definitions (110 or 112) and their instance-specific sub-classes, and of the branches 114.

Figure 3:
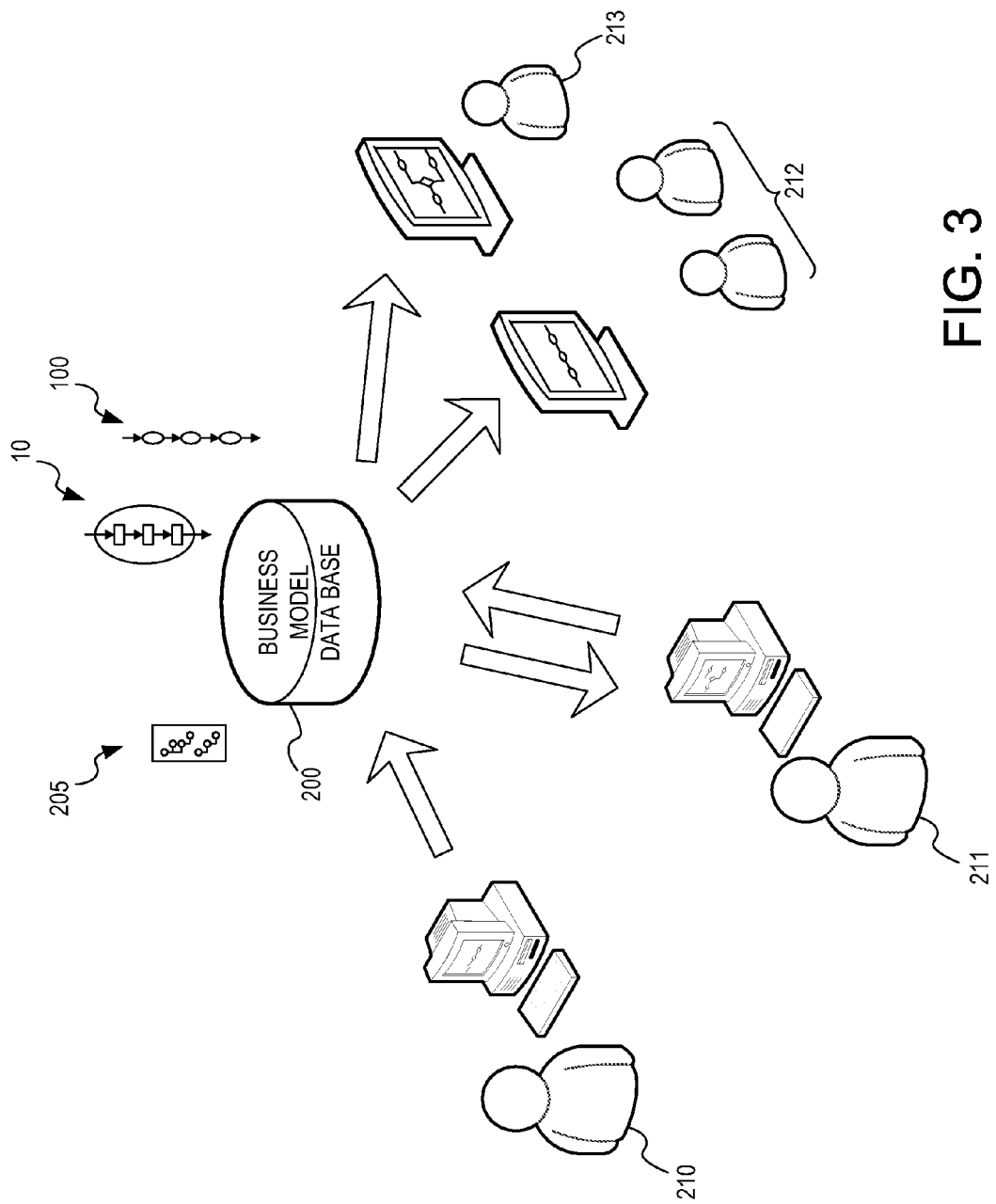
FIG. 3 depicts an overview of the operating environment for creating, manipulating, and utilizing the elements of the business model within the enterprise.

FIG. 3 depicts an overview of the creation, manipulation, and utilization of the elements of the business model (process, scenario, object, role tool/computing system, and applicability definitions and inter-relationships), and their related architecture indices of an organization according to one or more embodiments of the invention. Here, library 200, sometimes referred to herein as business model data base, stores process definitions 10 and their indices 30 and 32, and scenario definitions 100 and their index 130, object model 80 and its index 81, role definitions 22 and their index 23, tool definitions 24 and their index 25, applicability definitions 14 and their index 15, and all their inter-relationships (as shown in FIG. 1). Each of these objects are used in concert for creating new definitions and variations, creating new versions, controlling and managing the creation process and access to the definitions, and deploying the definitions for use.

As utilized herein, business models include the detailed, structured, open, and computer-sensible definitions describing how a business is to operate. These models include definitions of what products the business produces, what processes it uses to produce them, what roles are used to perform the process, what tools are used to support performance of the process and how they are used, and where and when the processes are performed. The business model architecture includes the specific elements of a business model that set the structure, scope, and context for the detail design of the business model. Contents of this architecture includes primary and secondary process indices containing, for example, process category/subcategory names and descriptions, and the names of processes in the categories; a thread index, containing, for example, thread category/sub-category names and names of threads in the categories; a business object index containing, for example, business object category/sub-category names and descriptions and names of objects in the categories; a role index containing, for example, role category/sub-category names and descriptions and names of roles in the categories; and a computing system index containing, for example, computing system category/sub-category names and descriptions and names of computing systems in the categories, and an applicability index containing, for example, category/sub-category names and descriptions and names of the enterprises organizational units to which the process and thread definitions may apply and of the points in time for which they apply.

The described business models include business model elements, including, but are not limited to, process models (primary and secondary process indices (process categories), process definitions (for the processes in the index), thread indices, and thread definitions (linked sub-threads and/or process instances with references to process definitions)); business object models ((product/data model), business object indices, conceptual/business object model (COM/BOM): product definitions, attributes definitions, product relationship definitions for all input and output products, their sub-classes and super-classes); role and organization definitions (role index, role descriptions (individual, team and formal organizations), and an organization structure); a computing system definition including a computing system index and application and delivery system architecture and detail definitions.

As further described herein, it is important to understand that while each specific element of the business model is configuration-controlled as a unit, inter-relationships between the elements require that this library be managed in an integrated manner by a single Business Model Data Manager.

In FIG. 3, process designer 210 creates process definitions 10 utilizing computer software. These process definitions mirror, describe, or otherwise inform about actual processes (or processes that will be implemented). Such processes may include steps for assembling a product or subassembly, steps for providing a particular service, and so forth. For example user 210 may create a process definition 10 which explains one method for assembling a portion of an airplane fuselage. In creating process definition 10, process designer 210 creates and links multiple process steps.

Each process step of the process definition 100 requires one or more inputs, involves one or more actions to be performed, and produce any number of outputs. Inputs and outputs may comprise physical objects or substances, waste products, specific information, forms for completion, and so forth, or conceptual objects such as the design of a system. A process definition 10 represents the packaging of one or more process steps 18 (shown in FIG. 1) connected in a sequence defined by their I/O connections 70 (shown in FIG. 1). In order to share definitions of inputs and outputs across process steps (and across process definitions), they are defined as business objects in a Business or Conceptual Object Model 80. Process definitions 10 can also include branches, where a decision must be made, and different process steps followed depending on the outcome.

Scenario designer 211 may further modify business model elements stored in the business model database of library 200. Scenario designer 211 may instance process definitions in sequences, creating scenario 100. Scenario 100 may include an instance of process definition 10, in combination with instances of other process definitions and scenarios, with branches. An "instance" is a virtual copy (not a physical copy, which could be modified once copied) of process definition 10 which references its parent process definition. Scenarios can thus be used to package instances of other scenarios and process definitions, joining outputs to inputs, and creating ever larger chains of process steps and decisions. In this manner, a large process can be broken down into ever smaller sub-processes, making the large process more manageable. In addition, process definitions can be re-used as instances in various scenarios, creating efficiencies within an organization.

Before new process definitions and scenarios are defined in detail, they are named and categorized or indexed in order to determine if similar, usable/modifiable definitions exist already and to simplify finding and reusing the objects. Both process definitions and scenarios have their own index. Multiple indices 205 can be utilized for either process definitions or scenarios, allowing users multiple ways to access the objects. For example, process definitions may be categorized based on product family, or on inputs utilized, and so forth. Each index 205 may further be a hierarchical index, where categories can have subcategories, which can also have sub-categories, and so forth. Business objects (the inputs/outputs of process steps), roles and tools (e.g., computing systems used to support a process step) are also indexed.

In addition to categorical indices 205, process and scenario definitions 10 and 100 within the business model database of library 200 are provided a trait referred to as applicability 14 (shown in FIG. 1 and in FIG. 2) as described above. The applicability trait is a statement that declares, for example, which organizations and for what timeframes a given process definition 10 or scenario definition 100 is applicable. For example, if the manufacturing department creates a generic process for retooling an assembly line, the applicability can be set to the department. If the process only applies to a specific type of assembly line, then applicability may be further limited. Likewise, if the research and development department creates a generic process for designing a new mechanical part, the process can be made applicable within the department. Applicability may also be set to required, such that all users within the applicable group must use the particular process definition for the relevant task. Furthermore, applicability may also enable or disable the ability to create variations of process or scenario definitions at a certain level within an organization. For example, an organization may wish to allow some groups to vary a process (e.g., due to the use of different tools), whereas others may be constrained to using the process as defined. Ultimately, an organization may desire to maximize the commonality of processes throughout the organization while allowing for variation and specialization where they make sense (e.g., where product-type differences dictate some difference in the process of designing or manufacturing of the product.

Once scenarios have been created, embodying instances of processes (or other smaller-scope scenarios), this information can be utilized to automatically generate training systems for employees 212, 213. A training presentation or reference document can be generated showing the steps required to perform a particular process definition or step. In addition, the information embodied in a database of library 200 can be used in conjunction with a workflow system to track and manage the flow of work in the process. A workflow system may prompt employees 212, 213 to perform particular process steps (e.g., via an email message or electronic pager), or it may accept work updates from employees as process steps are performed. Ultimately, by sharing processes across an organization, significant savings may be realized by avoiding the cost of reinventing processes. Furthermore, using shared processes to adhere an organization to certain computing systems (as specified in the shared processes) can avoid the high cost of selecting, acquiring, tailoring, and maintaining disparate computing systems.

Other uses of the objects in database of library 200 include the creation of metrics (e.g., key performance indicators (KPIs)) which can then be tracked. For example, as an employee uses a process definition to create multiple outputs, in conjunction with a workflow system, the quantity and efficiency of output can be tracked. Such a database may be also be used to create test processes and track test performance.

Library 200 may be housed within computers (shown in FIG. 4) as one or more physical databases, flat files, or other storage structures. They are stored in a single logical repository; if physically distributed, those repositories are linked. A business model application (shown in FIG. 4) can access library 200, and may be stored on computers, and may access the library locally on the same machine, or remotely over a network connection. The types of business model applications include, for example, modeling applications, analysis and simulation applications, view definition and generation applications, business model data management applications, deployment applications such as workflow and process-based planning applications, as well as business model development planning applications.

Figure 4:
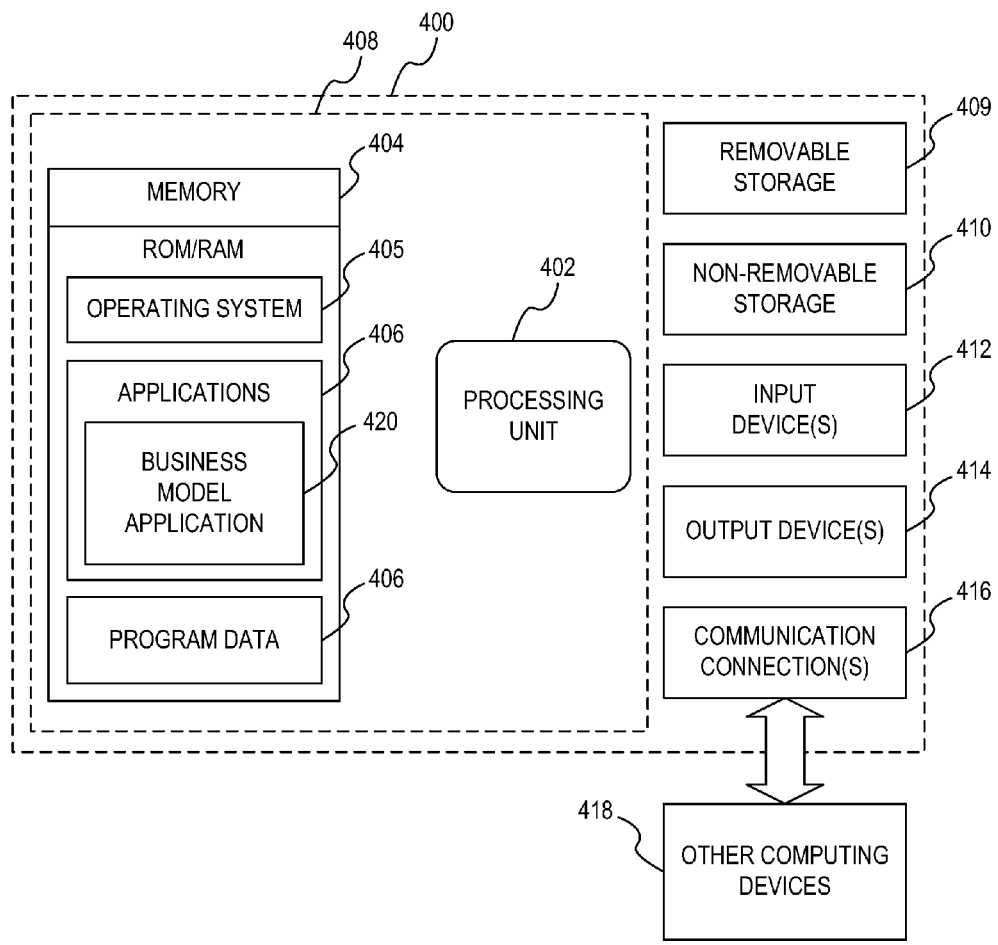
FIG. 4 depicts an exemplary operating environment in which one or more embodiments may be implemented.

FIG. 4 depicts an exemplary operating environment in which one or more embodiments of the invention may be implemented. The operating environment may comprise computing device 400 which may work alone or with other computing devices 418. Computing device 400 may comprise memory storage 404 coupled to processing unit 402. Any suitable combination of hardware, software, and/or firmware may be used to implement memory 404, processing unit 402 and other components. By way of example, memory 404, processing unit 402, and/or other components may be implemented within computing device 400 as shown, or may be implemented in combination with other computing devices 418. The systems, devices, and processors shown are used merely as examples.

Generally, program modules may include routines, programs, components, data structures, and other types of structures that perform particular tasks or implement particular abstract data types. Moreover, embodiments may be practiced with other computer system configurations, including hand-held devices, multiprocessor systems, microprocessor-based or programmable consumer electronics, minicomputers, mainframe computers, set-top boxes, and so forth. Embodiments may also be practiced in distributed computing environments where tasks are performed by other computing devices 418 that are linked through a communications network. In a distributed computing environment, program modules may be located in both local and remote memory storage devices.

Embodiments, for example, may be implemented as a computer process or method (e.g., in hardware or in software), a computing system, or as an article of manufacture, such as a computer program product or computer readable media. The computer program product may be a computer storage media readable by a computer system and encoded with a computer program of instructions for executing a process on computing device 400. The computer program product may also be a propagated signal on a carrier readable by a computing system and subsequently stored on a computer readable medium on computing device 100.

With reference to FIG. 4, the embodiment shown may include a computing device, such as computing device 400. In a basic configuration, computer device 400 may include at least one processing unit 402, and memory 404. Depending on the configuration of the computer device, memory 404 may be volatile (e.g., Random Access Memory (RAM)), non-volatile (e.g., Read-Only Memory (ROM), Flash, etc.), or some combination thereof. Memory 404 may serve as a storage location for operating system 405, one or more applications 406, and may include program data 407, as well as other programs. In one embodiment, applications 406 may include business model application 420.

Although the basic computing device configuration is contained within dashed-line box 408, computing device 400 may include additional features and functionality. For example, computing device 400 may include additional data storage components, including both removable storage 409 (e.g., floppy disks, memory cards, compact disc (CD) ROMs, digital video discs (DVDs), external hard drives, universal serial bus (USB) key drives, etc.) and non-removable storage 410 (e.g., magnetic hard drives).

Computer storage media may include media implemented in any method or technology for storage of information, including computer readable instructions, data structures, program modules, or other data. Memory 404, removable storage 409, and non-removable storage 410 are all examples of computer storage media. Further examples of such media include RAM, ROM, electrically-erasable programmable ROM (EEPROM), flash memory, CD-ROM, DVD, cassettes, magnetic tape, magnetic disks, and so forth. Any such computer storage media may be accessed by components which are a part of computing device 400, or which are external to computing device 400 and connected via a communications link (e.g., Bluetooth, USB, parallel, serial, infrared, etc.). Computing device 400 may also include input devices 412, such as keyboards, mice, pens, microphone, touchpad, touch-display, etc. Output devices 414 may include displays, speakers, printers, and so forth. Additional forms of storage, input, and output devices may be utilized.

Computing device 400 may also include one or more communication connections 416 which allow the computing device to communicate with other computing devices 418, such as over a network (e.g., a local area network (LAN), the Internet, etc.). Communication media, in the form of computer readable instructions, data structures, program modules, or other data in a modulated data signal, may be shared with and by device 400 via communication connection 416. Modulated data signal may mean a signal that has one or more of its characteristics set or changed in such a manner as to encode information in the signal, and may include a modulated carrier wave or other transport mechanism. Communication connection 416 may be comprised of hardware and/or software enabling either a wired (e.g., Ethernet, USB, Token Ring, modem, etc.) or wireless (e.g., WiFi, WiMax, cellular, acoustic, infrared, radio frequency (RF), etc.) communication conduit with other devices 418.

Figure 5:
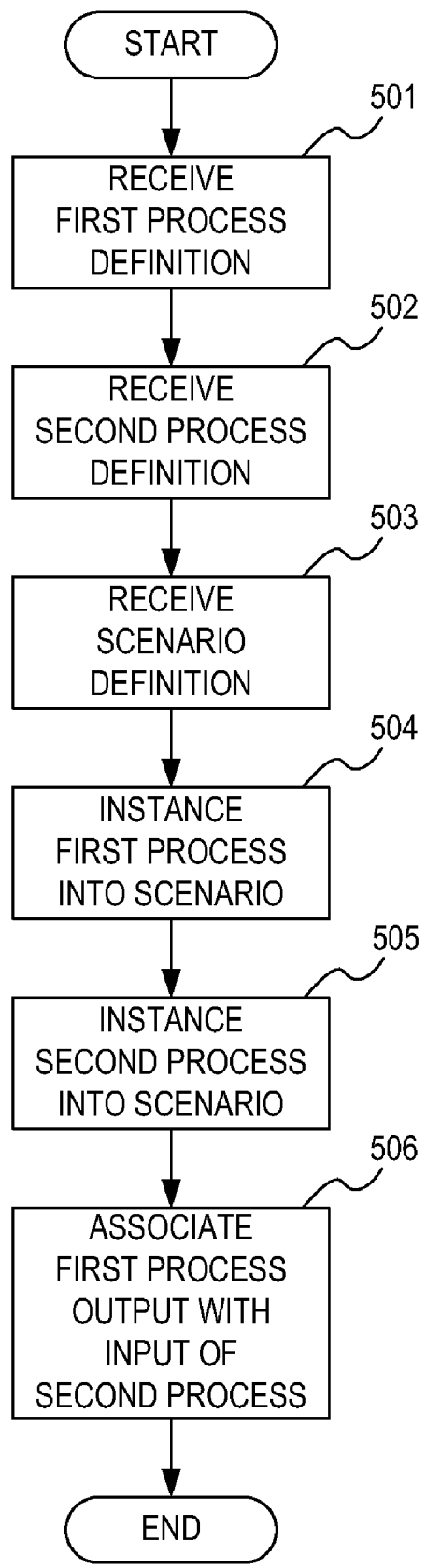
FIG. 5 is a flowchart depicting a simplified method for creating a process scenario utilizing multiple process instances.

FIG. 5 depicts a method for modeling a scenario definition utilizing multiple process definitions according to one or more embodiments of the invention. At step 501, a first process definition is received for entry into a library. The process definition may include one or more process steps, the steps being related to each other by the tying of outputs to inputs. The process definition may also include information about human roles required to complete the various steps in the process. When initially created, the process steps associated with the definition may be associated via a default variation and a default version. Subsequent variations and versions of the process definition may necessitate additional versions and variations being created. At step 502, a second process definition is received for entry into a library of processes.

At step 503, a scenario definition is received in which multiple processes and scenarios can be assembled. At step 504, an instance of the first process definition is added to the scenario definition created in step 503. This may have been indicated to business model application 420 (FIG. 4) via a user interface, in which a user selected a process definition, possibly via drag and drop, or simple selection from a list of process definitions. An instance of a process definition may reference a particular version and variation with no instance-specific information. However, an instance of a process or scenario definition may reference the stored version and variation of an object, coupled with instance specific attributes or variables. By instancing the process definition, changes can be made to the original process definition (in the form of a new version) without necessarily jeopardizing existing scenarios which are using the process. Scenario owners may be offered the opportunity to change or upgrade the instance of a process definition when a new version is created, for example. At step 505, the second process definition is also instanced into the scenario definition. And at step 506, the output or outputs of the instance of the first process definition are associated with one or more of the inputs of the second process definition.

To provide an example of the scenario and process definitions being created in this method, consider the manufacturing of a large passenger aircraft. The millions of parts required to produce a complete aircraft must be assembled using thousands of processes. Moreover, designing such an aircraft involves thousands of processes as well, from designing a part to producing assembly designs, and so forth. In this example, the first process definition may be a process to assemble an aileron subassembly. The second process definition may be a process to assemble a wing. The output of the first process (along with other process outputs), the aileron subassembly, would be an input to the wing assembly second process, which would produce its own output. Instances of these two assembly processes may be combined into a scenario for wing assembly, as provided by the method described in FIG. 5 above. The scenario may then be instanced into other parent assembly scenarios, ultimately producing a scenario for assembling the entire aircraft. When a subsequent aircraft is designed, process and scenario definitions can be re-instanced into new scenarios, saving work involved in process design. Likewise, if several different types of aircraft use the same general process to assemble an aileron subassembly, each aircraft may be able to create variations for specific implementation details which vary between designs. In addition, the process definition can be versioned (e.g., when a new more efficient process is determined), allowing scenario consumers of instances of the process definition to maintain the older version of the process, or possibly "upgrade" to the new process version.

For the large enterprise, as objects are placed in library 200 (FIG. 3), they may be shared for approval before they can be instanced and used. An approval system for process and scenario definitions may work with or mirror the functionality of a workflow system. Moreover, such a system may involve multiple levels of approval, requiring plans for process or scenario definitions to first be approved before any work is done on actually creating the definitions. Such a system may assist in the cataloging of business needs, the determination of requirements which summarize those needs, as well as the process and scenario definitions which will help fulfill the requirements.

While the invention has been described in terms of various specific embodiments, those skilled in the art will recognize that the invention can be practiced with modification within the spirit and scope of the claims.

What is claimed is:

1. A computer-implemented method for modeling one or more processes, the method comprising:
    creating, by a computing device, at least one process definition, wherein each process definition includes inputs and outputs of the process and at least one process step associated with an action to be performed, each created process definition characterized by at least an applicability trait, a variation identifier, and a version identifier;
    characterizing, by the computing device, the at least one process definition by at least the applicability trait and the variation identifier, the applicability trait descriptive of which organizations and for what timeframes within an enterprise each process definition is applicable, the variation identifier descriptive of variations made to the defined process to allow implementation of the variation of the process definition within the enterprise;
    storing the created process definitions in computer storage;
    creating, by the computing device, at least one scenario definition, wherein each scenario definition comprises an instantiation of at least one of the created process definitions and an applicability trait;
    characterizing, by the computing device, the at least one scenario definition by at least an applicability trait descriptive of which organizations and for what timeframes within the enterprise each said scenario definition is applicable; and
    storing the scenario definitions in computer storage.

2. The computer-implemented method of claim 1 wherein the applicability trait associated with each process definition and the applicability trait associated with each scenario definition define an organization to which the respective process definition and scenario definition applies.

3. The computer-implemented method of claim 1 wherein the applicability trait associated with each process definition and the applicability trait associated with each scenario definition define a timeframe to which the respective process definition and scenario definition applies.

4. The computer-implemented method of claim 1, the method further comprising utilizing a workflow system in conjunction with the at least one scenario definition to initiate and track completion of at least one process definition included in the at least one scenario definition.

5. The computer-implemented method of claim 1 wherein the at least one scenario definition incorporates at least one instantiation of another scenario definition.

6. The computer-implemented method of claim 1 wherein at least one process definition incorporates at least one instantiation of another process definition.

7. The computer-implemented method of claim 1 further comprising at least one of categorizing and indexing contemplated process definitions and contemplated scenario definitions prior to their creation in order to determine if at least one of similar, usable, and modifiable definitions already exist that can be reused with no or little modification.

8. The computer-implemented method of claim 1 further comprising utilizing multiple indices for the created process definitions and the created scenario definitions to provide multiple ways to access created processes and scenarios.

9. The computer-implemented method of claim 1 further comprising associating the at least one process definition with a tool definition.

10. The computer-implemented method of claim 1 further comprising categorizing the created process definitions based on a function of each of the process definitions using a process definition index.

11. A system configured to provide modeling of processes for implementation across an enterprise, wherein the system comprises:
    a computer processor; and
    a computer memory, in communication with said computer processor, wherein said computer memory stores instructions executable by said computer processor, said computer memory further comprising:
        at least one process definition, wherein each process definition includes inputs and outputs of the process and at least one process step associated with an action to be performed, each said process definition characterized by at least an applicability trait, and a variation identifier, the applicability trait descriptive of which organizations and for what timeframes within the enterprise each said process definition is applicable, the variation identifier descriptive of variations made to the defined process to allow implementation of the variation of the process definition within the enterprise; and
        at least one scenario definition, wherein each said scenario definition comprises at least one of an instantiation of a process definition and an instantiation of another scenario definition.

12. The system of claim 11, wherein said computer memory further comprises a version identifier associated with each said process definition, said version identifier representative of an evolution of said process definition.

13. The system of claim 11, wherein said computer memory further comprises an applicability trait descriptive of which organizations and for what timeframes within the enterprise each said scenario definition is applicable and a variation identifier descriptive of variations made to the defined scenario to allow implementation of the variation of the scenario definition within the enterprise.

14. The system of claim 11, wherein said computer memory further comprises a version identifier associated with each said scenario definition, said version identifier representative of an evolution of said scenario definition.

15. The system of claim 11, wherein said computer memory further comprises an index of process definitions and scenario definitions, said computer system operable to allow a user to search through said index to determine if a process definition or a scenario definition satisfies a concept for a desired process or scenario.

16. The system of claim 11, wherein said computer memory further comprises a workflow system, said workflow system causing said computer system to utilize a first said scenario definition to manage a flow of work through said process definitions and any other scenario definitions associated with the first said scenario definition.

17. The system of claim 11, wherein said computer memory further comprises multiple indices for referencing said process definitions and said scenario definitions to provide a user of said computer system multiple ways to access defined processes and defined scenarios.

18. The system of claim 11, wherein said computer memory further comprises categorization and indexing of new process definitions and new scenario definitions for determinations of whether similar, usable, or modifiable definitions are already within said computer memory.

19. An article of manufacture comprising a computer readable storage medium, the computer readable storage medium being encoded with a computer program of instructions for executing a method, the method comprising:
  creating at least one process definition, wherein each process definition includes inputs and outputs of a process and at least one process step associated with an action to be performed;
  characterizing each process definition by at least an applicability trait and a variation identifier, the applicability trait descriptive of which organizations and for what timeframes within the enterprise each process definition is applicable, the variation identifier descriptive of variations made to the defined process to allow implementation of the variation of the process definition within the enterprise;
  creating at least one scenario definition, wherein each scenario definition includes at least one of an instantiation of a created process definition and an instantiation of another scenario definition; and
  characterizing each scenario definition by at least an applicability trait descriptive of which organizations and for what timeframes within the enterprise each said scenario definition is applicable.

* * * * *